Nov. 15, 1932.  G. A. HATHERELL  1,887,930
CHEWING GUM BASE
Filed Nov. 24, 1930
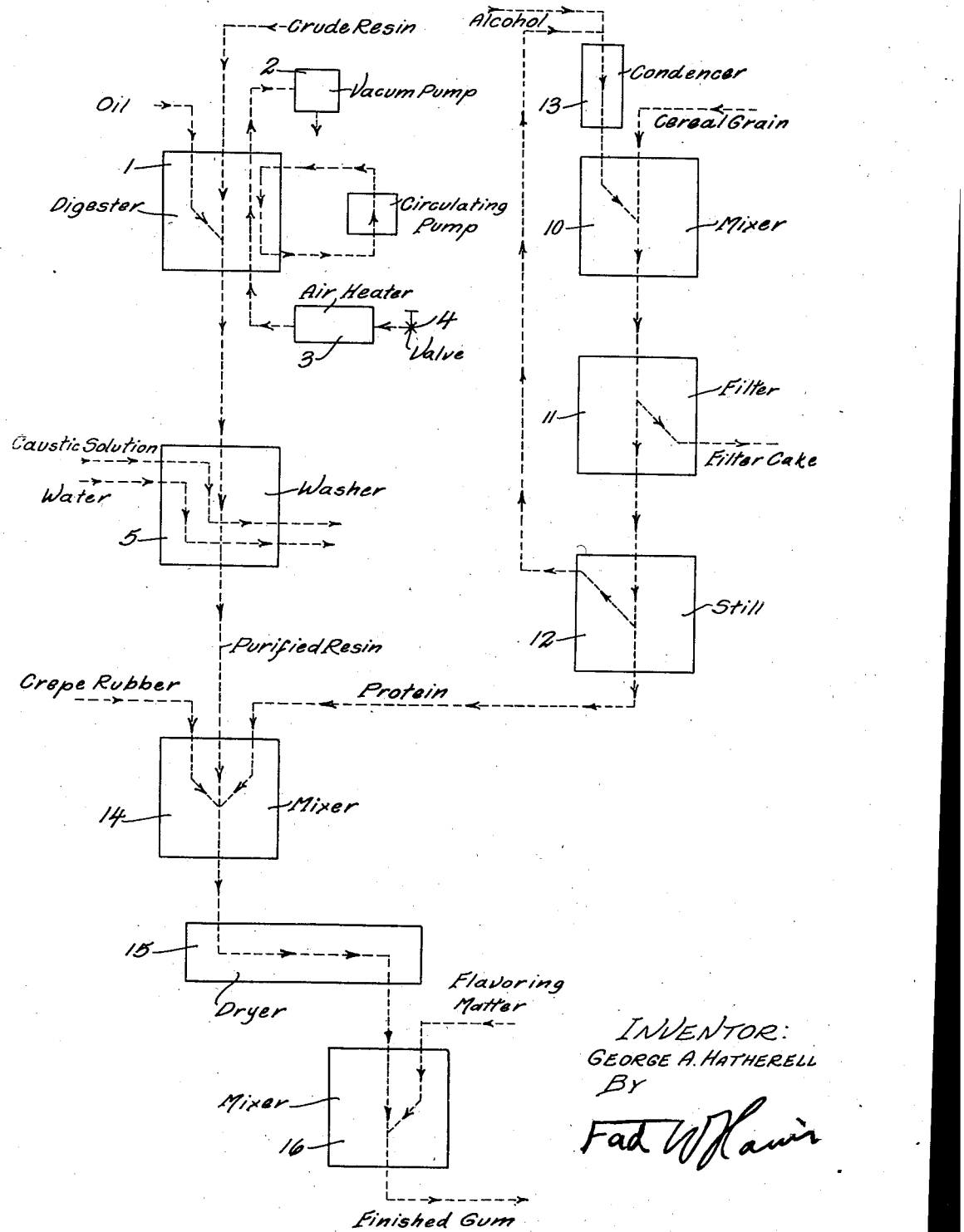
INVENTOR:
GEORGE A. HATHERELL
BY
Fad W Hawin
ATTORNEY.

Patented Nov. 15, 1932

1,887,930

UNITED STATES PATENT OFFICE

GEORGE A. HATHERELL, OF BURBANK, CALIFORNIA, ASSIGNOR TO FRANK A. GARBUTT, OF LOS ANGELES, CALIFORNIA

CHEWING GUM BASE

Application filed November 24, 1930. Serial No. 497,770.

My invention relates to chewing gum and an object of the invention is to produce a novel composition of matter from which, and a novel process by which, a superior chewing gum may be produced.

Large quantities of chewing gum are now produced by the blending of natural gums to which sugar and other flavoring matter, such as flavoring oils, are added. The natural gums derived from the sap of trees are commonly called "latex gums" which include chicle, jelutong, gutta kay, gutta hang kang, and several other products, including rubber.

While the term "gum" is somewhat loosely applied in the arts, I use the word herein to denote a vegetable gum of the latex type, or a synthetic or compounded substance having equivalent properties.

The latex gums, being of vegetable origin, may contain various impurities which deleteriously affect the physical characteristics, taste, or keeping qualities of the chewing gum in which they are used.

It is an object of my invention to compound a gum from substances which do not contain such impurities and which is therefore superior to the ordinary chewing gums as now sold.

It is a further object of my invention to compound a gum of substances whose proportions can be so controlled as to produce a gum of uniform and desirable characteristics.

I have found that rubber forms an excellent and preferred ingredient of chewing gum made by my process. Rubber, as ordinarily produced, is derived from the sap of plants in various degrees of purity. While the crepe rubber of commerce is the form ordinarily used by me, sprayed rubber is equally adaptable, as are also other rubbers as naturally or artificially produced. Rubber has the great advantages of being readily available, low in price, and obtainable in a high degree of purity.

I am aware that it has been proposed to use rubber as an ingredient of chewing gum, but with rather poor success. It is an object of my invention to so compound the rubber with other substances as to produce a chewing gum which is superior to and cheaper in cost of manufacture than the so-called chicle gums now on the market.

In the production of chewing gum by my process I combine the rubber with a suitable resin.

A resin to be suitable for my purposes must have the following properties:

(a) It must be a solvent for or soluble in rubber.

(b) It must be insoluble in alkaline solutions of mild strength and therefore tasteless and harmless when taken into the mouth.

(c) It must have no disagreeable odor.

(d) It must be stable and not tend to produce objectionable decomposition products.

(e) It must be moderately plastic at 100° C. and preferably at 60° C.

Some of the natural resins may have these properties but I prefer to use one of the synthetic resins having the above-defined properties. Synthetic resins (known as cumarone resins) are now produced by the polymerization of benzol fractions or other coal tar products and have the great advantages of being abundant, cheap, and of uniform characteristics.

I am aware that it has been proposed to use certain of the synthetic resins in chewing gum manufacture principally by compounding them with a natural gum or with a blend of natural gums, but so far as I am aware such compounds do not produce chewing gum of the desired characteristics. This I believe to be partly due to the fact that synthetic resins of high melting point have always been used in chewing gum manufacture. Such resins are hard substances which can not be used in any considerable proportion if we are to produce a sufficiently plastic chewing gum. If any attempt is made to use the low melting point synthetic resins of commerce in the manufacture of chewing gum, these low melting point resins impart a very disagreeable taste to the gum. This I believe is due to the presence in the low melting point resins now commercially available, of certain substances which are removed in the process now used in producing the high melting point resins.

To produce a suitable synthetic resin for my purpose from commercially available low melting point synthetic resins, I have found it necessary to remove these objectionable substances, which can be done by subjecting the resin to heat under a vacuum. I suspect that the objectionable substances are products produced in the previous process of manufacture of the low melting point resins of commerce, and find that they can be removed (without the formation of additional objectionable substances) if they are subjected to high temperature under a vacuum. It may be possible that synthetic resins suitable for my purpose are now commercially available but I have never been able to obtain commercially a synthetic resin of the properties defined above, nor do I believe that such a resin has ever been used in the manufacture of chewing gum.

Although a mixture of suitable synthetic resin compounded with rubber does not in itself constitute a high grade chewing gum, I have found that when such a base is properly compounded with a suitable protein and the necessary flavoring matter, a very good chewing gum results.

There are, of course, many different proteins, many of which are not suitable for my purpose. By the term "suitable protein" I wish to be understood as meaning a protein that has the following characteristics:

(a) It is not harmful when taken into the digestive tract and does not have an objectionable taste or odor, being insoluble or very slowly soluble in weak alkali solutions after being incorporated in the gum.

(b) It may be worked or kneaded into a plastic mass at ordinary atmospheric temperatures.

(c) It may, by suitable mixing, be mechanically combined with rubber and a suitable resin to form a chewing gum which when flavoring matter is added is of the proper plasticity without being excessively sticky.

While various proteins are suitable for my purpose, I prefer to use one of the alcohol soluble proteins derived from the cereal grains. These proteins are commonly included under the generic name of "prolamins" and include gliadin from wheat, zein from maize, and hordein from barley, as well as other proteins. The prolamins have the great advantage that they may contain considerable quantities of impurities without materially impairing their efficiency for my purpose.

The artificially extracted protein imparts certain highly desirable characteristics to the final product and I have found that a small proportion of this protein materially improves chewing gum compounded in the usual manner from the natural gums now used for this purpose.

In the practical operation of my invention I extract from a cereal grain, by the use of 70% grain alcohol, the suitable protein. For example, I may extract gliadin from wheat by mixing flour or fine wheat meal with alcohol, filtering out the insoluble cake, and evaporating the alcohol from the filtrate to leave the gliadin, which is an excellent substance for my purpose. I then mix one part of gliadin with one part of crepe rubber and six parts of purified low boiling point resin to which I add the necessary sugar and flavoring matter.

The preferred method of practicing my invention is shown on the annexed drawing in which the apparatus is shown diagrammatically and all valves, piping, etc. omitted since one skilled in the art could readily purchase the individual units, piping valves, and other necessary parts on the open market and install and connect them without using more than mere mechanical skill, having this description as a guide.

While it may be possible to obtain a resin or gum which is suitable in the raw state for use in producing my gum, I have never found such a resin and prefer to produce such a resin by the following process.

I first procure a resin (preferably a cumarone resin) having a melting point somewhat below 100° C., preferably between 50° C. and 100° C. Commercial resins of these characteristics made from benzol derivatives are available commercially but are not suitable for use in chewing gum due to their taste and odor. The resin is charged through a charging opening into the digester 1 shown diagrammatically in the drawing. The digester is provided with a hot oil jacket and is heated thereby to a temperature well above the melting point of the resin. The digester being a closed vessel capable of resisting atmospheric pressure, the vacuum pump 2 is started and the air is exhausted from the interior of the digester, preferably to absolute pressure of about 30 millimeters of mercury.

A stream of hot air is then admitted to the bottom of the digester, being drawn into the digester through a valve 4. No more air is admitted than the vacuum pump will exhaust so that the vacuum is maintained inside the digester throughout the operation. The air is heated in the air heater 3 prior to passing through the resin to the temperature of the oil jacket. This air bubbles up through the hot resin in the bottom of the digester and then passes upwardly through the digester.

To insure an intimate contact between the resin and the air, the resin is pumped into the extreme top of the digester and distributed by a sprayer over dividing means which break the hot resin up into fine films or streams which flow downwardly through the digester in intimate contact with the ascending air which is being continuously removed by the vacuum pump.

The action of the hot air on the resin is probably threefold. First, it tends to facilitate the escape of constituents of the resin which are vaporizable at the temperature maintained in the digester, which constituents I believe to be those which impart a disagreeable taste or odor to the resin. Second, the hot air tends to oxidize undesirable constituents in the resin, producing gases which are removed by the vacuum pump. And third, it tends to oxidize certain constituents of the resin producing solids which are readily removable by subsequent treatment later to be described.

The vacuum facilitates the vaporization and escape from the resin of any vapors or gases in the resin.

The circulation of the hot resin under vacuum is continued until the exhaust from the vacuum pump is substantially pure air.

While some commercial resins after treatment as above described have the proper viscosity for my purpose, I find it necessary at times to reduce the viscosity of the resin by allowing a small amount of neutral mineral oil to flow into the resin. I have found that a petroleum oil commonly termed "600W" is an excellent substance for my purpose. From 5% to 10% of oil is usually sufficient to produce the proper viscosity of the resin. After adding the oil, the injection of air, maintenance of vacuum, and circulation of hot resin is continued for a period equal to about one-half the previous period of treatment. This additional treatment not only thoroughly mixes the oil with the resin, but also further purifies the mixture.

The hot resin is then run into a washer 5 in which it is agitated in a hot 1% to 5% caustic soda solution for several hours and is then washed with several changes of hot water and finally neutralized by the addition of the small amount of acid necessary. The resulting resin is perfectly free from disagreeable odor or taste and can be freely used in chewing gum or other food products.

The protein may be produced by charging a mixer 10 with a finely divided cereal grain to which is added an equal weight of 70% grain alcohol. The prolamin in the grain is dissolved by the alcohol, and the mash so produced in the mixer 10 is passed through a filter 11. The alcohol insoluble or solid portion of the mash is then filtered out, forming a filter cake which is rejected. The alcohol containing the protein is then passed to a still 12 where the alcohol is distilled off, passing as a vapor to a condenser 13 from which it is passed to the mixer 10 and reused.

The protein, crepe rubber, and purified resin are then mixed in a mixer 14 and the mixture is passed to a drier 15 where a portion of the water is removed. The base of the proper consistency so produced is then passed to mixer 16 in which flavoring matter and sugar are added. The chewing gum is then in proper condition to be passed through the conventional forming and wrapping operations to produce the conventional chewing gum packages of commerce.

While the above described process produces a chewing gum of excellent characteristics, it is sometimes desirable for the purpose of imparting special characteristics to the gum to add to the base in the mixer 14 or the mixer 16 certain other substances such, for example, as pepsin, a small proportion of some of the natural gums, or certain other substances now used in the manufacture of chewing gum.

By my process I produce at low cost a chewing gum which is superior in its qualities to the chicle type gums now on the market, in that it has initially no objectionable taste or odor and develops neither when chewed; it may be kept over long periods without alterations of its characteristics; it has the desired plasticity when chewed and this plasticity is not altered by continued chewing; and it does not stick to the teeth even when chewed for long periods.

I claim as my invention:

1. A chewing gum base containing: rubber; a protein; and a resin.
2. A chewing gum base containing: rubber; a protein; and a cumarone resin.
3. A chewing gum base containing: rubber; a protein; and a resin which is a solvent for rubber, which is insoluble in alkaline solutions of mild strength, which is without disagreeable odor, and which is stable and does not produce objectionable decomposition products.
4. A chewing gum base containing: rubber; a protein; and a resin which is at least moderately plastic at 100° C.
5. A chewing gum base containing: rubber; a protein; and a resin which is at least moderately plastic at 100° C., which is a solvent for rubber, which is insoluble in alkaline solutions of mild strength, which is without disagreeable odor, and which is stable and does not produce objectionable decomposition products.

In testimony whereof, I have hereunto set my hand at Los Angeles, California, this 19th day of November, 1930.

GEORGE A. HATHERELL.